United States Patent
Heinzel et al.

(10) Patent No.: US 11,434,141 B2
(45) Date of Patent: Sep. 6, 2022

(54) SYNTHESIS OF AMMONIA WITH INTERNAL COOLING CIRCUIT

(71) Applicant: Linde Aktiengesellschaft, Munich (DE)

(72) Inventors: Albrecht Heinzel, Munich (DE); Thomas Haselsteiner, Dietramszell (DE); Florian Ettner, Munich (DE)

(73) Assignee: Linde Aktiengesellschaft, Munich (DE)

( * ) Notice: Subject to any disclaimer, the term of this patent is extended or adjusted under 35 U.S.C. 154(b) by 915 days.

(21) Appl. No.: 16/218,618

(22) Filed: Dec. 13, 2018

(65) Prior Publication Data
US 2019/0185332 A1    Jun. 20, 2019

(30) Foreign Application Priority Data
Dec. 14, 2017   (DE) .......................... 102017011601.6

(51) Int. Cl.
*C01C 1/04*     (2006.01)
*F25J 3/02*     (2006.01)

(52) U.S. Cl.
CPC ............ *C01C 1/047* (2013.01); *C01C 1/0447* (2013.01); *F25J 3/0276* (2013.01)

(58) Field of Classification Search
CPC ........ F25J 3/0685; F25J 3/0276; Y02P 20/52; C01C 1/047; C01C 1/0447; C01C 1/0405
See application file for complete search history.

(56) References Cited

U.S. PATENT DOCUMENTS 3,349,569 A * 10/1967 Nebgen ................... C01B 3/025
62/934

FOREIGN PATENT DOCUMENTS

DE      3707605 A1 *  9/1988   ........... C01C 1/0405

* cited by examiner

*Primary Examiner* — Yong L Chu
(74) *Attorney, Agent, or Firm* — Millen White Zelano & Branigan, PC; Brion P. Heaney

(57) ABSTRACT

The invention relates to a method for the synthesis of ammonia, in which a fresh gas consisting largely of hydrogen and nitrogen is compressed via a compressor and subsequently fed to an ammonia converter for conversion into a converter product containing ammonia and comprising hydrogen and nitrogen. Upstream of the compressor, ammonia is evaporated into the fresh gas in order to cool the fresh gas and to produce a cold substance mixture comprising ammonia and the fresh gas. The substance mixture is heated in a heat exchanger against at least one process stream to be cooled, and subsequently compressed via the compressor, to obtain a compressed substance mixture comprising ammonia and the fresh gas. Upstream of the circuit cooler, a gas mixture consisting largely of hydrogen and nitrogen is fed to a substance stream comprising the fresh gas. The constituents of the gas mixture are separated from the converter product and/or from the compressed substance mixture comprising ammonia and the fresh gas.

19 Claims, 1 Drawing Sheet

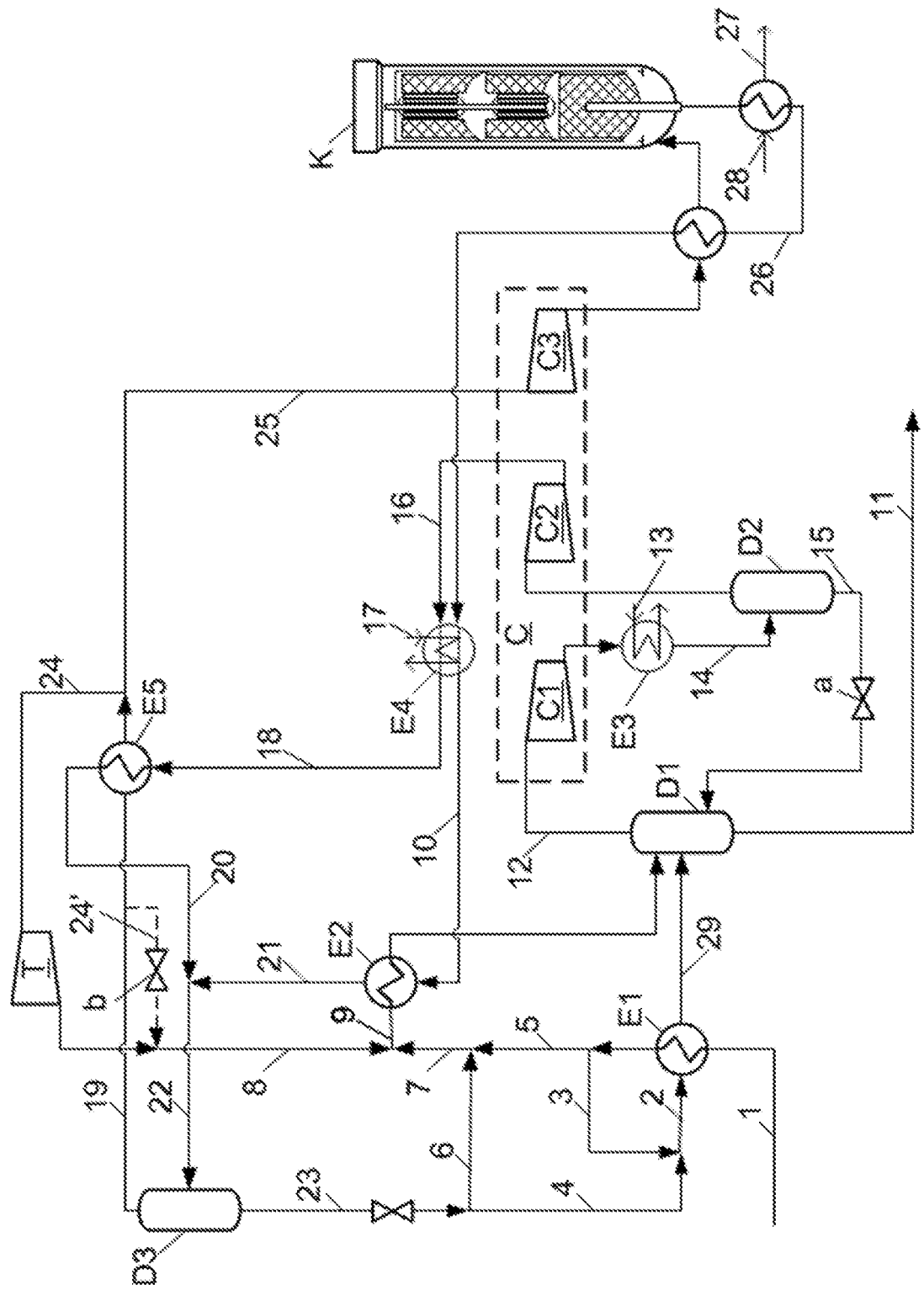

SYNTHESIS OF AMMONIA WITH INTERNAL COOLING CIRCUIT

The invention relates to a method for the synthesis of ammonia, in which a fresh gas consisting largely of hydrogen and nitrogen is compressed via a compressor (fresh-gas compressor) and subsequently fed to an ammonia converter for conversion into a converter product containing ammonia and comprising hydrogen and nitrogen, wherein, upstream of the fresh-gas compressor, ammonia is evaporated into the fresh gas in order to cool the fresh gas and to produce a cold substance mixture comprising ammonia and the fresh gas, said substance mixture being heated in a heat exchanger (circuit cooler) against at least one process stream to be cooled of the ammonia synthesis process, and subsequently compressed via the fresh-gas compressor, in order to obtain a compressed substance mixture comprising ammonia and the fresh gas.

According to the prior art, on the industrial scale, ammonia is produced from carbon-containing energy sources such as for example natural gas, crude oil, coal or biomass, which in this case, in a first process step, are converted into a raw synthesis gas. The raw synthesis gas is then processed in further process steps to form a synthesis gas consisting largely of hydrogen and nitrogen, in which the two gases are present in the ratio of 3:1 at a pressure of between 20 and 30 bar(a), said ratio being stoichiometric for the synthesis of ammonia. The synthesis gas is then fed as fresh gas to an ammonia synthesis circuit, wherein, following compression via a fresh-gas compressor, said gas enters an ammonia converter at a pressure of between 120 and 180 bar(a) in order to be converted into ammonia in an exothermic reaction with catalytic assistance. Owing to thermodynamic limitations, however, the conversion is realized only in an incomplete manner, with the result that a converter product is formed, which, in addition to ammonia, also has considerable proportions of hydrogen and nitrogen. The product gas leaves the converter at a temperature of between 400 and 450° C., and is subsequently cooled in a series of heat exchangers in order to separate by way of condensation the ammonia formed and to obtain a residual gas consisting largely of hydrogen and nitrogen, which is recirculated for the purpose of increasing the ammonia yield and which, together with fresh gas, is supplied as feed gas to the ammonia converter.

In order to achieve sufficiently high degrees of ammonia separation, the converter product is expediently cooled to a temperature level of between 10° C. and −5° C. If appropriate, the ammonia product obtained has to be further cooled to −33° C. in order to allow its atmospheric storage in a pressureless tank. The cooling power required for these cooling purposes is either generated externally or is provided by an internal cooling circuit which is integrated in terms of material into the ammonia synthesis process, as is described for example in laid-open specification DE3707605A1.

For the purpose of external cold generation, a refrigerant, which is for example ammonia, is conducted in a closed cooling circuit, in this case evaporated at low pressure in indirect heat exchange against at least one process stream to be cooled of the ammonia synthesis process, and re-condensed following compression via a refrigerant compressor at elevated pressure.

In DE3707605A1, use is likewise made of ammonia as a refrigerant, which in this case however is not conducted in a closed circuit but is admixed in liquid form to the fresh gas prior to its compression in the fresh-gas compressor, wherein it predominantly evaporates. Cold is formed during the evaporation, which is used to meet the refrigeration requirement of the cooling traps and, if appropriate, for cooling to the desired end temperature the ammonia separated from the converter product. The compression of the evaporated refrigerant, which compression is also required in this variant, is realized together with the fresh gas via the fresh-gas compressor, with the result that a separate refrigerant compressor may be dispensed with.

The internal cooling circuit known from the prior art allows a reduction in the investment costs for ammonia synthesis to be realized, this being of interest in particular for small ammonia installations in which an external cooling circuit with its own refrigerant compressor gives rise to a large proportion of the installation costs. However, the cooling power of the internal cooling circuit is limited by the quantity of ammonia which is able to be evaporated, this being dependent on the pressure, the temperature and the likewise limited quantity of the fresh gas, and this therefore, in some cases, not being sufficient to meet the refrigeration requirement for the synthesis of ammonia.

It is the object of the present invention to specify a method of the generic type, by way of which it is possible to overcome the described disadvantages of the prior art.

According to the invention, the object addressed is achieved in that, upstream of the circuit cooler, a gas mixture consisting largely of hydrogen and nitrogen is fed to a substance stream comprising the fresh gas, the constituents of which gas mixture are separated from the converter product and/or from the compressed substance mixture comprising ammonia and the fresh gas.

The substance stream comprising the fresh gas, to which the gas mixture consisting largely of hydrogen and nitrogen is fed, may be fresh gas or a substance stream formed from fresh gas through admixing of liquid ammonia.

The invention makes possible an internal cooling circuit which, in comparison with the prior art, has increased cooling power since, with an unchanged fresh gas quantity, a larger gas quantity is available upstream of the first heat exchanger, which, for the cold generation, allows more ammonia to evaporate than in the prior art. The cooling power of the internal cooling circuit can, by way of the flow guidance according to the invention, be adapted within wide limits to the cold requirement for the synthesis of ammonia.

Expediently, upstream of the circuit cooler, the hydrogen and nitrogen quantities in the substance stream comprising the fresh gas are increased only to such an extent that the cooling power required for the synthesis of ammonia can be completely provided but excessive cold cannot be generated.

Preferably, the gas mixture fed according to the invention has the same hydrogen/nitrogen ratio as the fresh gas, which is normally introduced into the ammonia synthesis process with the stoichiometric ratio of 3:1. However, different hydrogen/nitrogen ratios should not be excluded if the composition of feed gas fed to the ammonia converter, for the provision of which the fresh gas serves, is set further downstream to the stoichiometric ratio.

In the circuit cooler, the heating of the ammonia and of the substance mixture comprising the fresh gas is preferably realized against the converter product alone, wherein ammonia contained in the converter product condenses and a two-phase substance mixture is formed. Heating against another process stream or multiple process streams of the ammonia synthesis process, which may also include the converter product, should however not be excluded.

In order to fully exploit the potential of the internal cooling circuit and not to unnecessarily increase the substance stream to the fresh-gas compressor, the quantity of the ammonia fed in liquid form is expediently controlled such that the substance mixture comprising the fresh gas exits the circuit cooler with an ammonia-saturated gas phase. The condition for this is that, upstream of the circuit compressor, the substance mixture is present in two-phase form, with a liquid phase consisting of ammonia, which, in the most favourable case, completely evaporates during the heat absorption in the circuit cooler. In practice, however, a two-phase substance mixture, in which a small ammonia quantity forms the liquid phase, will also exit the circuit cooler.

Preferably, after being combined with the converter product cooled in the circuit cooler, the substance mixture compressed in the fresh-gas compressor and comprising the fresh gas undergoes ammonia separation in order to obtain the gas mixture consisting largely of hydrogen and nitrogen for the admixing to the substance stream comprising the fresh gas upstream of the circuit cooler. However, it is also possible to obtain the gas mixture consisting largely of hydrogen and nitrogen from the substance stream compressed in the fresh-gas compressor and comprising the fresh gas or from the converter product cooled in the circuit compressor by way of the separation of ammonia.

The pressure of the substance stream compressed in the fresh-gas compressor and comprising the fresh gas and of the converter product cooled in the circuit compressor are both greater than 100 bar(a). For the purpose of separating ammonia, one of these substance streams or a substance stream formed from both of them is—if appropriate following cooling for condensation of ammonia—expediently separated into liquid ammonia and a gas phase consisting largely of hydrogen and nitrogen with low pressure loss in a separator, which gas phase, owing to its composition, is suitable for the feeding according to the invention to a substance stream comprising fresh gas upstream of the circuit cooler, said substance stream, as described above, being present at a significantly lower pressure of approximately 30 bar(a).

In order to use the existing pressure difference energetically, it is proposed to expand at least a part of the gas phase obtained in the separator and consisting largely of hydrogen and nitrogen in one step in a work-performing manner via an expander to the pressure of the substance stream comprising the fresh gas. With this type of expansion, the gas mixture undergoes considerable cooling, which can be used directly for the provision of cold for the ammonia synthesis. In order to prevent ammonia contained in the gas mixture to be expanded from condensing and leading to damage of the expander, it is further proposed to heat the gas mixture and to feed said gas mixture to the expander at a temperature at which ammonia condensation can be ruled out with certainty. The heating may be realized for example against the substance stream compressed in the fresh-gas compressor and comprising the fresh gas in order to condense contained ammonia.

Another possibility is to use a throttle member for the expansion of the gas mixture. In this case, even in the case of single-stage expansion, it is possible to dispense with the heating of the gas mixture since throttle members which are insensitive to condensed ammonia are known from the prior art and able to be used. However, a disadvantage is that considerably less cold is generated here than in the case of expansion via an expander.

As a third possibility, it is proposed to carry out the expansion in at least two steps, with one step being realized via an expander and the second step being realized via a throttle member. In this case, it is likewise possible to dispense with the heating of the gas mixture to be expanded if, owing to the pressure loss via the throttle member, the pressure gradient remaining for the expander is not sufficient for ammonia condensation.

BRIEF DESCRIPTION OF THE DRAWING

The invention will be explained in more detail below on the basis of an exemplary embodiment illustrated schematically in FIG. 1.

FIG. 1 shows a preferred configuration of the method according to the invention for the synthesis of ammonia.

The fresh gas 1 present at a pressure of between 20 and 30 bar(a) and consisting largely of hydrogen and nitrogen is pre-cooled in the pre-cooler E1 against the coolant stream 2, which is formed from a first part 3 of the pre-cooled fresh gas 1 and liquid ammonia 4. In order to be able to completely use the cooling potential of the pre-cooled fresh-gas part 3, the quantity of the liquid ammonia 4 is such that, even in the coolant stream 29 heated in the pre-cooler E1, liquid ammonia is present, this subsequently being separated from the ammonia-saturated gas phase in the low-pressure separator D1.

For further temperature reduction, liquid ammonia 6 is likewise admixed to the second part 5 of the pre-cooled fresh gas 1, only a small part of said liquid ammonia firstly evaporating owing to pressure, temperature and quantity of the fresh gas 5. In order to reduce the ammonia partial pressure and allow the evaporation of a larger quantity of ammonia, the gas stream 8 likewise consisting largely of hydrogen and nitrogen is admixed to the substance stream 7 comprising the fresh gas and containing liquid ammonia, with the two-phase substance mixture 9 being formed, said substance mixture being introduced into the heat exchanger E2, which is referred to as a circuit cooler and where the major part of the liquid ammonia evaporates during the cooling of the converter product 10 obtained in the ammonia converter K. Residues of liquid ammonia are separated in the low-pressure separator D1, from whose bottom ammonia 11 is drawn off as liquid product. A gas phase 12 consisting largely of hydrogen and nitrogen and containing ammonia exits the low-pressure separator D1 at the top in order to be compressed to an intermediate pressure of approximately 40 to 60 bar(a) in the first stage C1 of the fresh-gas compressor C.

In the intermediate cooler E3, the use of cooling water 13 is sufficient for condensing out a part of the contained ammonia from the gas phase 12 compressed to the intermediate pressure, and for producing the two-phase substance mixture 14 which is introduced into the medium-pressure separator D2 for the purpose of separating the liquid ammonia. The separated ammonia is drawn off from the bottom of the medium-pressure separator D2 via line 15 and is introduced into the low-pressure separator D1 after expansion via the throttle member a. The pressure of the gas phase 16 obtained in the medium-pressure separator D2 is raised in the second stage C2 of the fresh-gas compressor C before it is introduced into the condenser E4 in order to condense out further ammonia with the aid of cooling water 17. Heat is further removed from the two-phase substance mixture 18 formed in the condenser E4 against the gas phase 19 fed in a largely ammonia-free manner from the high-pressure separator D3 and consisting largely of hydrogen and nitrogen in order to condense out additional ammonia and to obtain the two-phase substance mixture 20, which is combined together with the likewise two-phase substance mixture 21 obtained in the circuit cooler E2 from the converter product 10 to form the substance stream 22 and, for the purpose of separating liquid ammonia 23 required for cold generation, introduced into the high-pressure separator D3.

Following heating in the fresh-gas cooler E5, from the gas phase 19 consisting largely of hydrogen and nitrogen, which is present at a pressure of between 115 and 175 bar(a) and a hydrogen/nitrogen ratio of 3:1, a partial stream 24 is branched off, which, following work-performing expansion in the expander T, is fed via line 8 to the substance stream 7 comprising the fresh gas and containing liquid ammonia.

Alternatively, it is also possible for a partial stream 24' to be branched off from the gas phase 19 consisting largely of hydrogen and nitrogen upstream of the fresh-gas cooler E5, and expanded via the throttle member b, before being conducted into the substance stream 7 via line 8.

The remainder 25 of the gas phase 19 consisting largely of hydrogen and nitrogen is compressed to a pressure of between 120 and 180 bar(a) in the third stage C3 of the fresh-gas compressor C and, following heating in the heat exchanger E6 against hot converter product 26 which has already been pre-cooled against boiler feed water 28 in the process-gas cooler E7, with steam 27 being produced, is fed as feed gas to the ammonia converter K. The converter product 26 cooled in the heat exchanger E6 is introduced into the condenser E4 in order to condense out ammonia with the aid of cooling water 17 and to obtain the two-phase substance stream 10.

The invention claimed is:

1. A method for the synthesis of ammonia, comprising:
compressing a fresh gas containing hydrogen and nitrogen via a compressor and subsequently feeding the fresh gas to an ammonia converter for conversion into a converter product containing ammonia, hydrogen, and nitrogen,
upstream of the fresh-gas compressor, evaporating ammonia into the fresh gas in order to cool the fresh gas and to produce a substance mixture comprising ammonia and the fresh gas,
heating said substance mixture in a circuit cooler against at least one process stream to be cooled, and subsequently compressing the substance mixture via the compressor to obtain a compressed substance mixture comprising ammonia and the fresh gas, and
upstream of the circuit cooler, feeding a gas mixture containing hydrogen and nitrogen to the fresh gas or to the cold substance stream formed from admixing the fresh gas and the liquid ammonia, wherein the constituents of said gas mixture are separated from the converter product and/or separated from the compressed substance mixture comprising ammonia and the fresh gas.

2. The method according to claim 1, wherein the gas mixture is fed to a substance stream formed from fresh gas through admixing of liquid ammonia.

3. The method according to claim 1, wherein the quantity of the ammonia admixed with the fresh gas is controlled such that the substance mixture comprising the fresh gas exits the circuit cooler with an ammonia-saturated gas phase.

4. The method according to claim 1, wherein said at least one process stream is the converter product and the substance mixture comprising ammonia and the fresh gas is heated in the circuit cooler against the converter product, wherein ammonia contained in the converter product condenses.

5. The method according to claim 1, wherein, after being combined with the converter product cooled in the circuit cooler, the substance mixture compressed in the fresh-gas compressor and comprising the fresh gas undergoes ammonia separation in order to obtain the gas mixture containing hydrogen and nitrogen for admixing to the substance stream comprising the fresh gas upstream of the circuit cooler.

6. The method according to claim 5, wherein the ammonia separation is realized in a separator from which a gas phase containing hydrogen and nitrogen, and a liquid ammonia phase are withdrawn.

7. The method according to claim 6, wherein a part of the gas phase obtained in the separator is, in one step, expanded in a work-performing manner via an expander to the pressure of the substance stream comprising the fresh gas.

8. The method according to claim 6, wherein a part of the gas phase obtained in the separator is, in one step, expanded in a work-performing manner via a throttle member to the pressure of the substance stream comprising the fresh gas.

9. The method according to claim 6, wherein a part of the gas phase obtained in the separator is, in a first step via an expander and in a second step via a throttle member, expanded to the pressure of the substance stream comprising the fresh gas.

10. The method according to claim 7, wherein the part of the gas phase to be expanded is heated before expansion.

11. The method according to claim 1, wherein, prior to be being compressed in the compressor and after being heating against said at least one process stream to be cooled, the substance mixture is sent to a first separator where the substance mixture is separated into a first gaseous phase containing hydrogen and nitrogen and a first liquid ammonia phase.

12. The method according to claim 11, wherein said first gaseous phase from the first separator is compressed in a first stage of the compressor and then sent to a second separator wherein the first gaseous phase is separated into a second gas phase and a second liquid ammonia phase.

13. The method according to claim 12, wherein said second gaseous phase from the second separator is compressed in a second stage of the compressor to form the compressed substance mixture, and the second liquid ammonia phase from the second separator is sent to the first separator.

14. The method according to claim 13, wherein said at least one process stream is the converter product which is cooled in the circuit cooler, and wherein the compressed substance mixture is combined with the converter product cooled in the circuit cooler and then subjected to ammonia separation in order to obtain the gas mixture containing hydrogen and nitrogen that is admixed to the substance stream upstream of the circuit cooler.

15. The method according to claim 14, wherein the ammonia separation is realized in an ammonia separator from which a gas phase containing hydrogen and nitrogen, and a liquid ammonia phase are withdrawn.

16. The method according to claim 15, wherein the liquid ammonia phase withdrawn the ammonia separator is combined with a portion of the fresh gas to a coolant stream which used to preheat the fresh gas in a preheater before said ammonia is evaporated into the fresh gas.

17. The method according to claim 16, wherein said coolant stream is removed from the preheater and introduced into the first separator.

18. The method according to claim 15, wherein gas phase containing hydrogen and nitrogen withdrawn from the ammonia separator is compressed and then sent to the ammonia converter.

19. The method according to claim 18, wherein gas phase containing hydrogen and nitrogen withdrawn from the ammonia separator is compressed in a third stage of the compressor.

* * * * *